US012516863B2

(12) United States Patent
Im et al.

(10) Patent No.: US 12,516,863 B2
(45) Date of Patent: *Jan. 6, 2026

(54) REFRIGERATOR

(71) Applicant: LG ELECTRONICS INC., Seoul (KR)

(72) Inventors: Jihyun Im, Seoul (KR); Yoomin Park, Seoul (KR); Jindong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 25 days.

This patent is subject to a terminal disclaimer.

(21) Appl. No.: 18/599,394

(22) Filed: Mar. 8, 2024

(65) Prior Publication Data

US 2024/0210093 A1 Jun. 27, 2024

Related U.S. Application Data

(63) Continuation of application No. 18/137,658, filed on Apr. 21, 2023, now Pat. No. 11,953,257, which is a (Continued)

(30) Foreign Application Priority Data

Nov. 2, 2015 (KR) .................. 10-2015-0153125

(51) Int. Cl.
*F25D 17/06* (2006.01)
*F25B 39/00* (2006.01)
(Continued)

(52) U.S. Cl.
CPC ............ *F25D 17/067* (2013.01); *F25B 39/00* (2013.01); *F25D 11/02* (2013.01); *F25D 17/062* (2013.01);
(Continued)

(58) Field of Classification Search
CPC .................. F25D 2323/023; F25D 2317/0682
See application file for complete search history.

(56) References Cited

U.S. PATENT DOCUMENTS 5,584,191 A 12/1996 Kwon
5,826,437 A 10/1998 Kim
(Continued)

FOREIGN PATENT DOCUMENTS

CN 203857739 10/2014
CN 203857739 U * 10/2014
(Continued)

OTHER PUBLICATIONS

International Search Report in International Application No. PCT/KR2016/011831, dated Dec. 14, 2016.
(Continued)

*Primary Examiner* — Ana M Vazquez
(74) *Attorney, Agent, or Firm* — KED & ASSOCIATES, LLP

(57) ABSTRACT

A refrigerator including a housing mounted at a rear surface of a door to define a storage space of food, a basket disposed inside the housing, a duct extending to the housing from one side of an evaporator to supply cold air generated by the evaporator into the storage space of the housing, and a fan assembly coupled to the duct to allow the cold air to be forcibly supplied.

24 Claims, 15 Drawing Sheets

Related U.S. Application Data continuation of application No. 17/964,578, filed on Oct. 12, 2022, now Pat. No. 11,940,199, which is a continuation of application No. 16/706,460, filed on Dec. 6, 2019, now Pat. No. 11,506,442, which is a continuation of application No. 16/209,455, filed on Dec. 4, 2018, now Pat. No. 10,527,340, which is a continuation of application No. 15/290,373, filed on Oct. 11, 2016, now Pat. No. 10,174,987.

(51) Int. Cl.
  *F25D 11/02* (2006.01)
  *F25D 17/08* (2006.01)
  *F25D 23/02* (2006.01)
  *F25D 23/04* (2006.01)
  *F25B 39/02* (2006.01)

(52) U.S. Cl.
  CPC ............ *F25D 17/08* (2013.01); *F25D 23/02* (2013.01); *F25D 23/028* (2013.01); *F25D 23/04* (2013.01); *F25B 39/02* (2013.01); *F25D 23/025* (2013.01); *F25D 2317/062* (2013.01); *F25D 2317/0664* (2013.01); *F25D 2317/067* (2013.01); *F25D 2317/0672* (2013.01); *F25D 2317/0681* (2013.01)

(56) References Cited

U.S. PATENT DOCUMENTS

| | | | |
|---|---|---|---|
| 5,896,752 | A | 4/1999 | Park |
| 5,927,095 | A | 7/1999 | Lee |
| 6,044,654 | A | 4/2000 | Igari et al. |
| 7,866,182 | B2 | 1/2011 | Lim et al. |
| 8,464,549 | B2 | 6/2013 | Davis et al. |
| 8,752,918 | B2 | 6/2014 | Kang |
| 10,240,851 | B2 | 3/2019 | Kim et al. |
| 2004/0007010 | A1 | 1/2004 | Kopf et al. |
| 2005/0160756 | A1 | 7/2005 | Lee et al. |
| 2006/0096310 | A1 | 5/2006 | Lee |
| 2008/0148761 | A1 | 6/2008 | Venkatakiishnan et al. |
| 2011/0023527 | A1 | 2/2011 | Kwon et al. |
| 2011/0023528 | A1 | 2/2011 | Kwon |
| 2011/0100047 | A1 | 5/2011 | Kim et al. |
| 2012/0023997 | A1 | 2/2012 | Jung et al. |
| 2012/0062093 | A1 | 3/2012 | Lee et al. |
| 2013/0033163 | A1 | 2/2013 | Kang |
| 2014/0132143 | A1 | 5/2014 | Kim et al. |
| 2014/0132146 | A1 | 5/2014 | Kim et al. |
| 2016/0238302 | A1 | 8/2016 | Yang et al. |
| 2017/0159992 | A1 | 6/2017 | Eom |

FOREIGN PATENT DOCUMENTS

| | | |
|---|---|---|
| EP | 1581777 | 9/2010 |
| JP | S 63-142682 | 9/1988 |
| JP | H 03-175247 | 7/1991 |
| JP | 2000-121230 | 4/2000 |
| JP | 2004-211977 | 7/2004 |
| KR | 20-0123895 | 8/1998 |
| KR | 10-0377762 | 3/2003 |
| KR | 10-2003-0083812 | 11/2003 |
| KR | 10-2005-0004926 | 1/2005 |
| KR | 10-2006-0076860 | 7/2006 |
| KR | 10-0607286 | 7/2006 |
| KR | 10-2007-0040120 | 4/2007 |
| KR | 20070040120 A * | 4/2007 |
| KR | 10-0826718 | 4/2008 |
| KR | 10-0894480 | 4/2009 |
| KR | 10-2009-0101525 | 9/2009 |
| KR | 10-2009-0128898 | 12/2009 |
| KR | 10-2010-0025236 | 3/2010 |
| KR | 10-2010-0061959 | 6/2010 |
| KR | 10-2010-0122155 | 11/2010 |
| KR | 10-2011-0085394 | 7/2011 |
| KR | 30-0689425 | 4/2016 |
| KR | 10-1651334 | 8/2016 |

OTHER PUBLICATIONS

Notice of Allowance in U.S. Appl. No. 15/474,728, dated Aug. 24, 2017.
Office Action in U.S. Appl. No. 15/290,373, dated Oct. 25, 2017.
Extended European Search Report in European Application No. 16862321.3, dated May 29, 2019.
Office Action in European Application No. 16 862 321.3, dated Jun. 23, 2020.
Office Action in Korean Application No. 10-2015-0153125, dated Dec. 23, 2021 (with English translation).
Extended European Search Report in European Application No. 21192782.7, dated Jan. 5, 2022.
Office Action in Korean Application No. 10-2022-0071197, dated Jan. 18, 2023.
Office Action in U.S. Appl. No. 17/964,578 dated Apr. 5, 2023.
Korean Office Action dated Apr. 25, 2023 issued in Application No. 10-2022-0071197.
U.S. Office Action dated Aug. 10, 2023 issued in U.S. Appl. No. 18/137,658.
Korean Notice of Allowance dated Sep. 27, 2024 issued in Application No. 10-2023-0082033.
European Search Report dated Oct. 30, 2024 issued in Application No. 24189088.8.

* cited by examiner

REFRIGERATOR

CROSS-REFERENCE TO RELATED APPLICATIONS

This application is a continuation of U.S. patent application Ser. No. 18/137,658, filed Apr. 21, 2023, which is a continuation of U.S. patent application Ser. No. 17/964,578 filed Oct. 12, 2022, which is a continuation of U.S. patent application Ser. No. 16/706,460, filed Dec. 6, 2019, now U.S. Pat. No. 11,506,442, which is a continuation of U.S. patent application Ser. No. 16/209,455, filed Dec. 4, 2018, now U.S. Pat. No. 10,527,340, which is a continuation of U.S. patent application Ser. No. 15/290,373, filed Oct. 11, 2016, now U.S. Pat. No. 10,174,987, which claims priority under 35 U.S.C. § 119 to Korean Application No. 10-2015-0153125 filed in Korea on Nov. 2, 2015, whose entire disclosures are hereby incorporated by reference.

BACKGROUND

The present disclosure relates to a refrigerator.

An example of a conventional refrigerator is disclosed in Korean Patent Publication No. 2010-0122155 (published on Nov. 22, 2010). The refrigerator disclosed therein includes a door that opens and closes a storage compartment in the refrigerator, the door having a double structure including an inner door and an outer door. A housing that forms an accommodation space is provided at a rear surface of the inner door, which comes in close proximity with a cabinet. The inner door also includes an opening that allows access to the inside of the housing. The opening is blocked by the outer door.

According to the above-described double door and accommodation housing structure, a user can minimize cold air in the storage compartment of the refrigerator from being leaked to the outside. However, this structure has certain disadvantages.

For example, when food is accommodated in the housing, the cold air in the storage compartment of the refrigerator is not sufficiently supplied into the housing. Particularly, an evaporator that generates cold air to be supplied into the storage compartment is installed at the rear side of a back wall of the storage compartment, and an outlet through which the cold air is supplied into the storage compartment is formed in the back wall of the storage compartment.

Additionally, the housing is located relatively far away from the back wall. Therefore, cold air may not be sufficiently supplied into the housing. Moreover, food stored in the housing serves blocks the flow of cold air, and therefore, the cold air supplied into the housing may not sufficiently circulate.

Thus, for at least the foregoing reasons, the temperature in the housing may be about 2 to 3° C. greater than the temperature in the storage compartment, e.g., the temperature of shelves provided in the storage compartment. The embodiments of the present invention provide solutions to the conventional technology.

SUMMARY

The present disclosure is directed to a refrigerator in which cold air is sufficiently supplied into a housing, thereby maintaining the internal temperature of the housing to a set temperature or less.

The present disclosure is also directed to a refrigerator having a structure for uniformly distributing cold air into a housing.

The present disclosure is also directed to a refrigerator having a structure in which cold air circulating in a housing is not interrupted by a basket provided in the housing.

The present disclosure is also directed to a refrigerator having a structure in which cold air generated by an evaporator is directly supplied into a housing.

To achieve these and other advantages and in accordance with the purpose of this specification, as embodied and broadly described herein, there is provided an embodiment of a refrigerator that includes a housing mounted at a rear surface of a door to define a storage space of food; a basket disposed inside the housing; and a fan assembly installed at a top surface part of the housing, the fan assembly supplying cold air in a storage compartment toward the basket, wherein the fan assembly includes: a blowing fan generating a blowing force; and a shroud guiding the flow of cold air passing through the blowing fan.

There is provided another embodiment of a refrigerator that includes a housing mounted at a rear surface of a door to define a storage space of food, the housing having an opened top surface part; a basket disposed inside the housing; a fan cover covering the top surface part of the housing, the fan cover having a cold air inlet formed therein; a blowing fan installed at a lower side of the fan cover; and a shroud forming a flow path of cold air passing through the blowing fan.

The details of one or more embodiments are set forth in the accompanying drawings and the description below. Other features will be apparent from the description and drawings, and from the claims.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention. In the drawings.

DETAILED DESCRIPTION OF THE EMBODIMENTS

Hereinafter, exemplary embodiments of the present invention will be described in more detail with reference to the accompanying drawings. It is understood that the present disclosure is not intended to limit the claims to the specific embodiments set forth herein. To the contrary, the present invention covers alternatives, modifications, and equivalents as may be included within the spirit and scope of the present disclosure, and would be appreciated by a person having ordinary skill in the art to which the present disclosure pertains.

Figure 1:
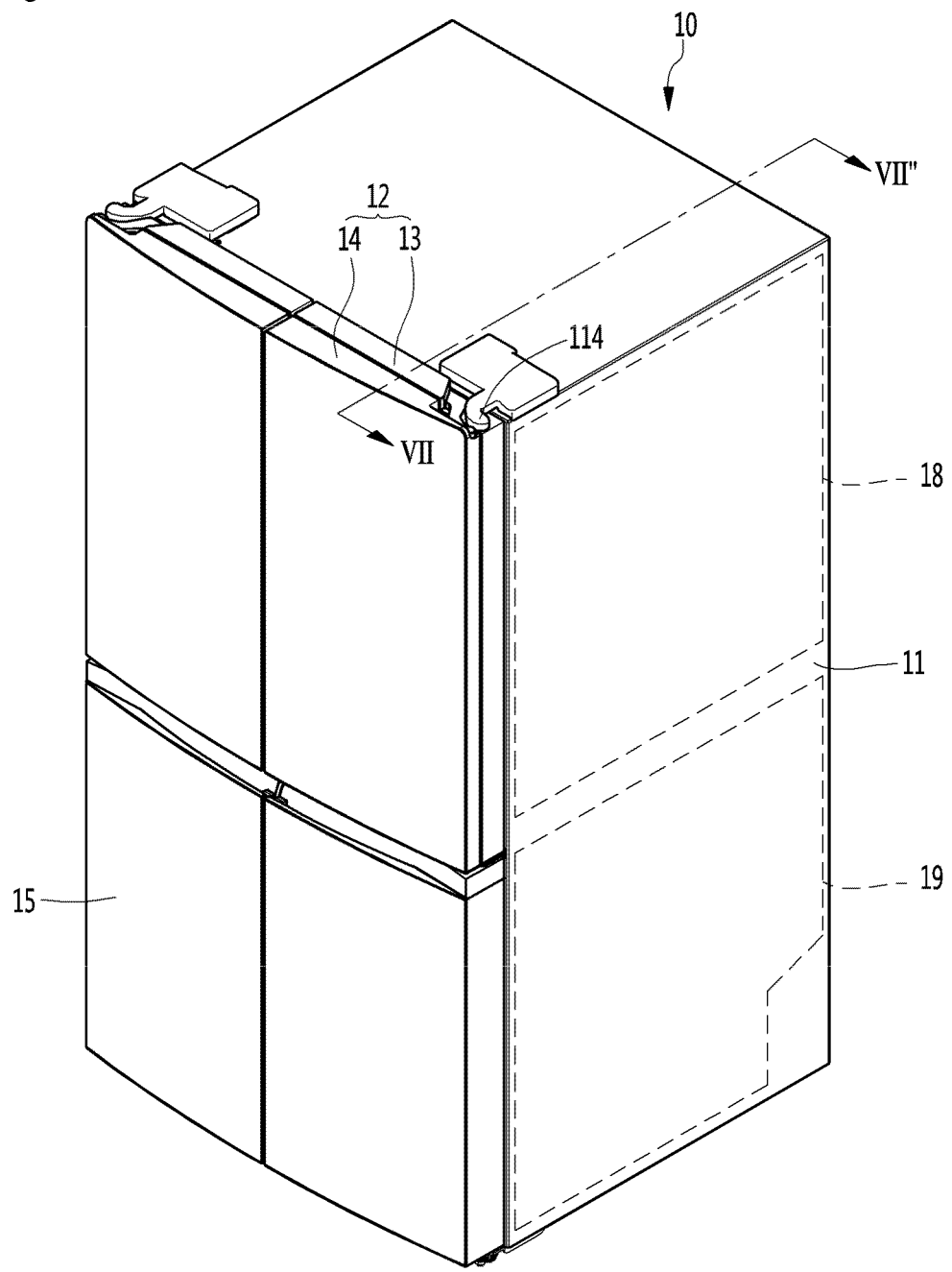
FIG. 1 is a perspective view of a refrigerator according to a first embodiment of the present disclosure.
Figure 2:
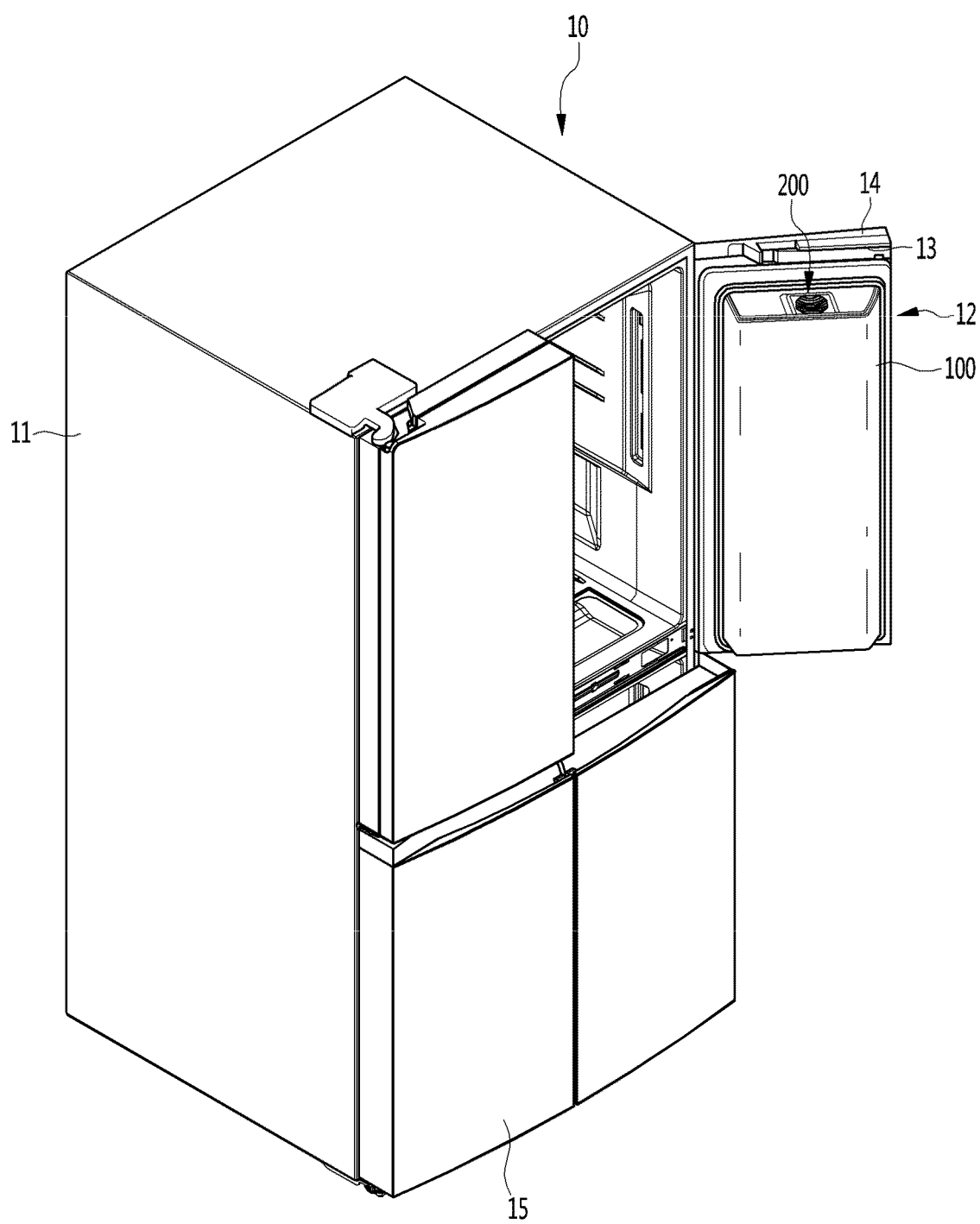
FIG. 2 is a perspective view showing a state in which a refrigerating compartment door of the refrigerator is opened according to the first embodiment.
Figure 3:
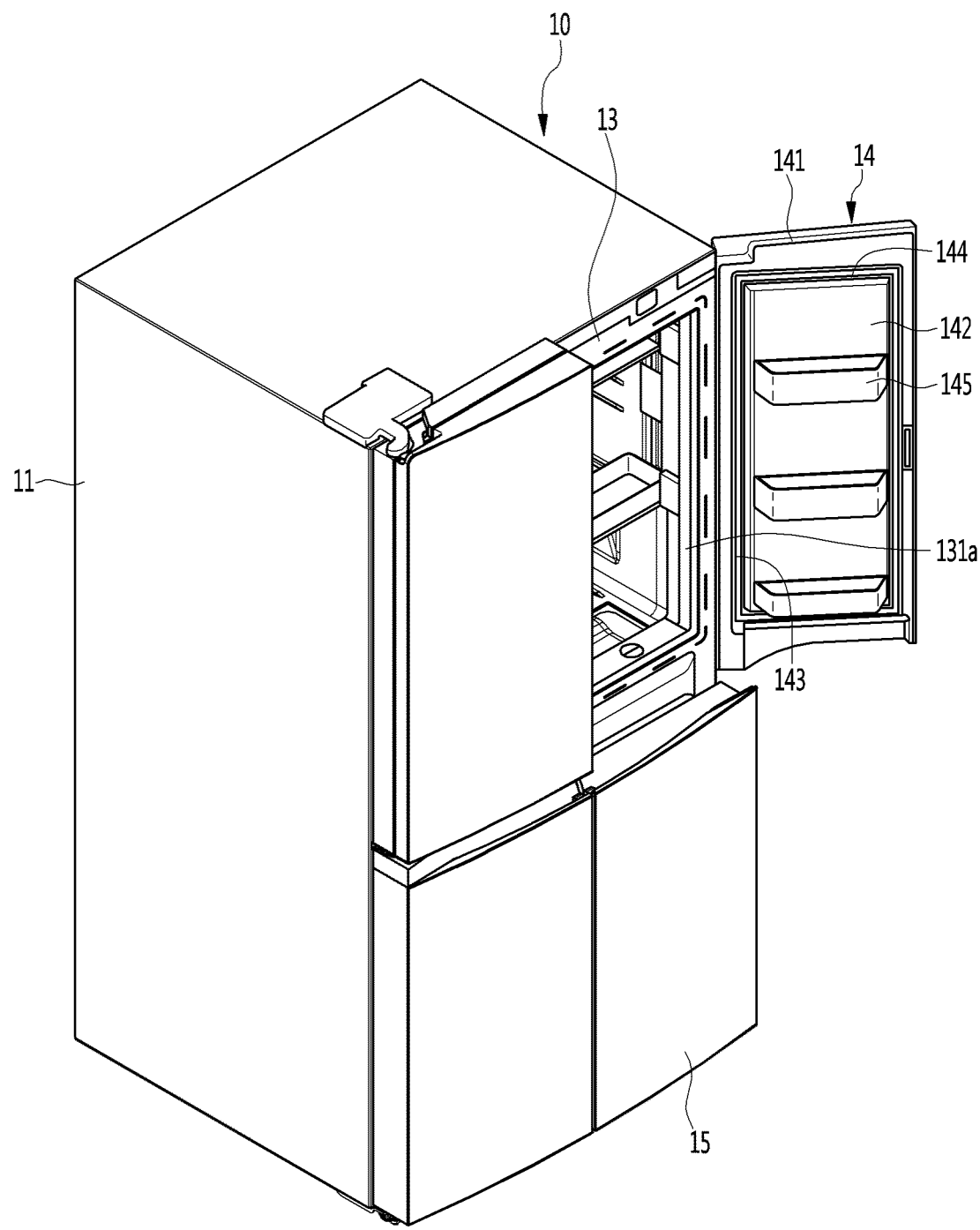
FIG. 3 is a perspective view showing a state in which an outer door in the refrigerating compartment door of the refrigerator is opened according to the first embodiment.
Figure 4:
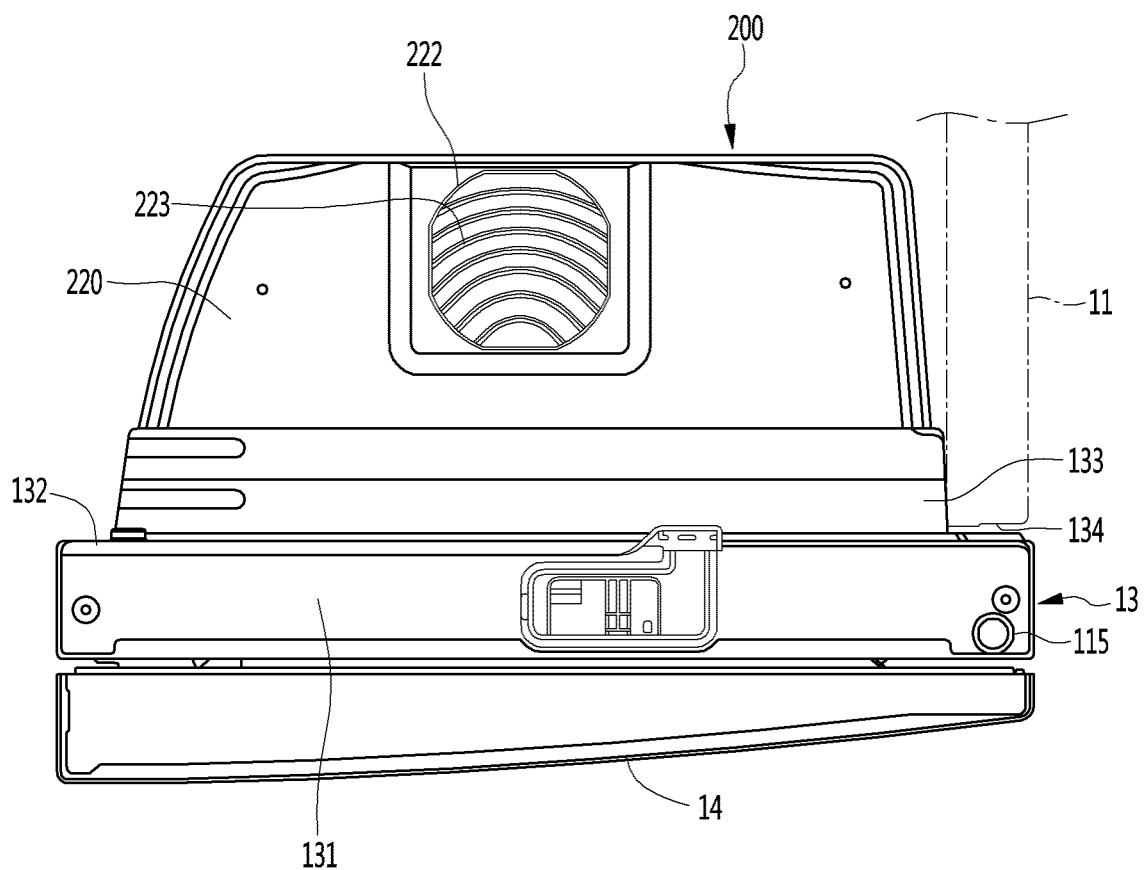
FIG. 4 is a plan view showing configurations of a housing and the refrigerating compartment door of the refrigerator according to the first embodiment.

FIG. 1 is a perspective view of a refrigerator according to a first embodiment of the present disclosure. FIG. 2 is a perspective view showing a state in which a refrigerating compartment door of the refrigerator is opened according to the first embodiment. FIG. 3 is a perspective view showing a state in which an outer door in the refrigerating compartment door of the refrigerator is opened according to the first embodiment. FIG. 4 is a plan view showing configurations of a housing and the refrigerating compartment door of the refrigerator according to the first embodiment.

Referring to FIGS. 1 through 4, the refrigerator 10 may include a cabinet 11 having a storage compartment provided therein. The cabinet 11 may include a door 12 and 15 provided at a front surface thereof to selectively open and close the storage compartment.

The storage compartment may include a refrigerating compartment 18 and a freezing compartment 19. The door 12 and 15 may include a refrigerating compartment door 12 being rotatably provided at the front of the refrigerating compartment 18 and a freezing compartment door 15 being rotatably provided at the front of the freezing compartment 19. As another example, the freezing compartment door 15 may be configured as a drawer type door provided to be withdrawable in a forward direction.

The refrigerator further includes an evaporator to generate and supply cold air into the refrigerating compartment 18 to be refrigerated. The evaporator may be provided at the rear side of a back wall of the refrigerating compartment 18, and an evaporation fan 70 (see FIG. 9) for supplying the cold air may be further provided at the rear side of the back wall of the refrigerating compartment 18.

The refrigerating compartment door 12 is provided in a pair, so that the pair of refrigerating compartment doors can be rotatably connected to left and right edges of the front surface of the cabinet 11, respectively.

In addition, the refrigerating compartment door 12 may include an inner door 13 that comes in close proximity with the front surface of the cabinet 11 and an outer door 14 rotatably connected to the inner door 13 at a front surface of the inner door 13. Here, the inner door 13 and the outer door 14 may be referred to as a first door and a second door, respectively.

An edge of a rear surface of the inner door 13 may come in close proximity with the front surface of the cabinet 11 in a state in which the inner door 13 is close, and an edge of a rear surface of the outer door 14 may come in close proximity with the front surface of the inner door 13 in a state in which the outer door 14 is close.

A first hinge device 114 that allows the refrigerating compartment door 12 to be rotatable with respect to the cabinet 11 may be installed at an upper side of the cabinet 11. For example, one portion of the first hinge device 114 may be connected to a top surface of the cabinet 11, and the other portion of the first hinge device 114 may be connected to the inner door 13. Both of the inner door 13 and the outer door 14 may be rotated about the first hinge device 114.

The refrigerator 10 may further include a second hinge device 115 that allows the outer door 14 to be rotatable with respect to the inner door 13 (such as shown in FIG. 4). The outer door 14 may be independently rotated about the second hinge device 115, and the front surface of the inner door 13 may be opened by the rotation of the outer door 14.

The inner door 13 may include a first outer case 131 forming an external appearance, a first door liner 132 attached to a rear surface of the first outer case 131, and a first door dike 133 protruding to a predetermined height from the first door liner 132. The first door dike 133 may be enclosed along an outer edge of the first door liner 132.

An access hole 131a having a predetermined size may be formed inside the inner door 13. The access hole 131a is selectively opened and closed by the outer door 122, and provides access to the storage compartment.

A housing 100 that defines a food storage space may be attached to the rear surface of the inner door 13. The housing 100 may be attached to the first door dike 133. The front-rear direction width of the food storage space formed at the inner door 13 may be defined as the sum of a length corresponding to the thickness of the inner door 13, which is defined by the first outer case 131 and the first door liner 132, the front-rear direction protruding length of the first door dike 133, and the front-rear direction width of the housing 100.

A first sealing member 134 may be provided at the first door liner 132. As shown, the first sealing member 134 may be disposed along a front edge of the cabinet 11 to prevent leakage of cold air in a space between the cabinet 11 and the inner door 13.

The outer door 14 may include a second outer case 141 forming an external appearance, a second door liner 142 attached to a rear surface of the second outer case 141, and a second door dike 143 protruding to a predetermined height from the second door liner 142. The second door dike 143 may be enclosed along an outer edge of the second door liner 142.

An outer basket 145 capable of accommodating food therein may be installed at the rear surface of the outer door 14. The outer basket 145 may be separably attached to the second door dike 143. For example, the outer basket 145 may be provided in plurality, and the plurality of outer basket 145 may be disposed to be spaced apart by a set distance in the top-bottom direction.

A second sealing member 144 may be provided at the second door liner 142. As shown, the second sealing member 144 may be disposed along a front edge of the first outer case 131 of the inner door 13 to prevent leakage of cold air in a space between the inner door 13 and the outer door 14.

A fan assembly 200 for supplying cold air in the storage compartment, i.e., the refrigerating compartment 18, to the storage space in the housing 100 may be provided in the housing 100. The fan assembly 200 may include a fan cover 220 to cover one opened surface of the housing 100, the fan cover 220 having an inlet 222, and a blowing fan 210 (see FIG. 6) provided at a lower side of the fan cover 220. The blowing fan 210 allows cold air to be forcibly introduced into the housing 100 through the inlet 222. A grill 223 may be provided in the inlet 222.

Hereinafter, configurations of the inner door 13, the housing 100, and the fan assembly 200 will be described in detail with reference to the accompanying drawings.

Figure 5:
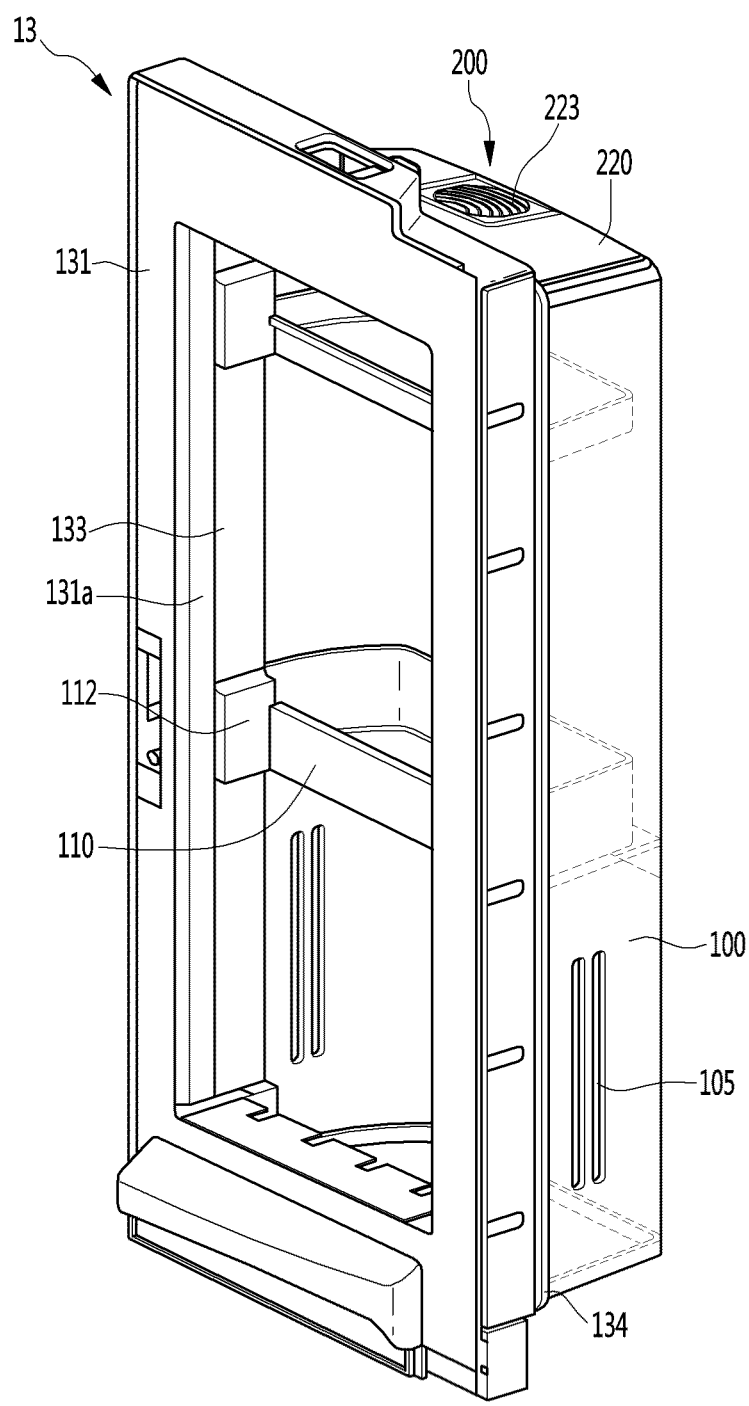
FIG. 5 is a perspective view showing a configuration of an inner door in the refrigerating compartment door of the refrigerator according to the first embodiment.
Figure 6:
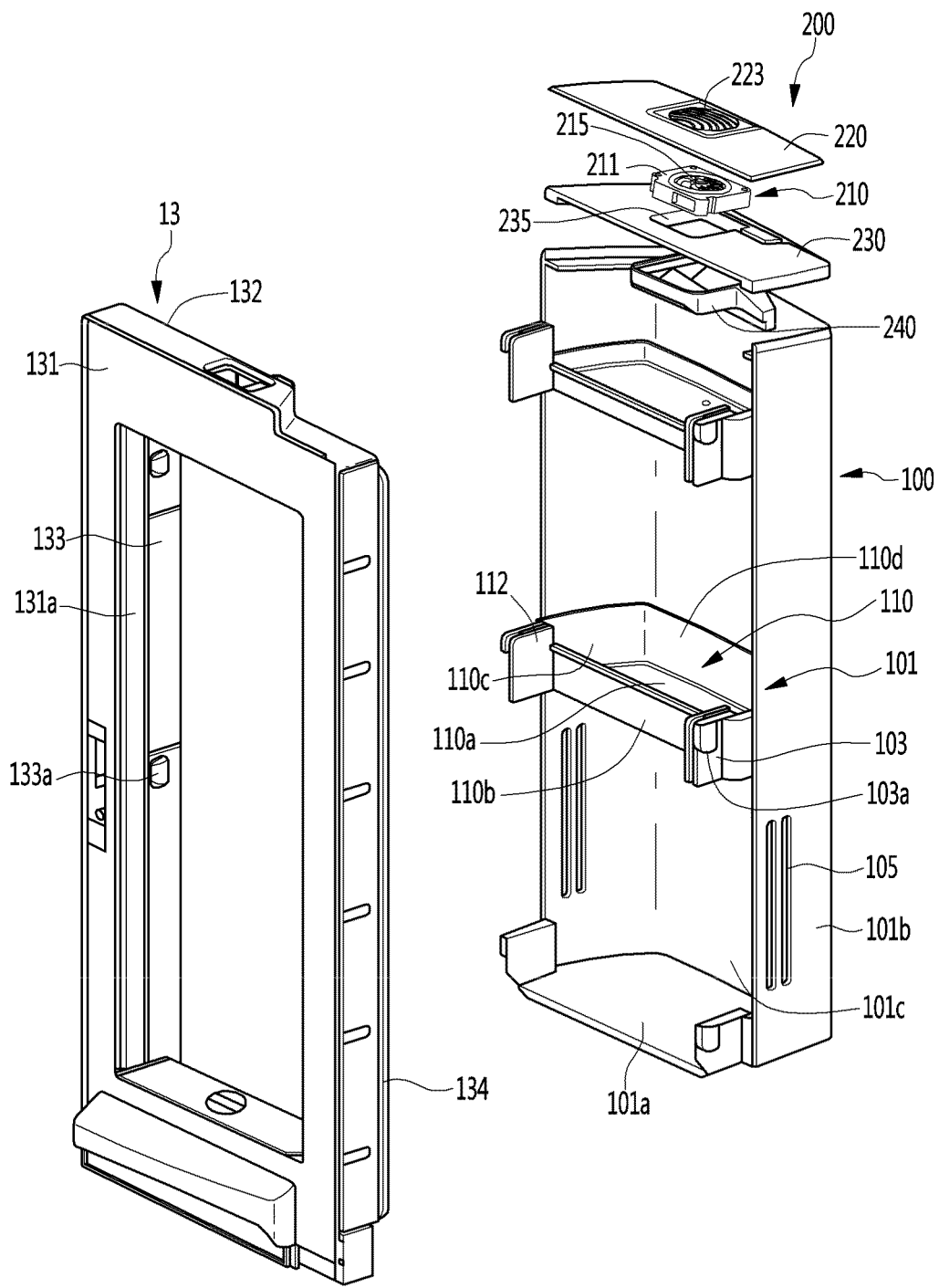
FIG. 6 is an exploded perspective view showing the configuration of the inner door according to the first embodiment.

FIG. 5 is a perspective view showing a configuration of the inner door in the refrigerating compartment door of the refrigerator according to the first embodiment of the disclosure. FIG. 6 is an exploded perspective view showing the configuration of the inner door.

Referring to FIGS. 5 and 6, the refrigerator 10 may include the inner door 13, the housing 100 attached to the rear of the inner door 13, and the fan assembly 200 provided at one surface of the housing 100.

The access hole 131a may be formed in the inner door 13, and the storage space of the housing 100 may be provided at the rear of the access hole 131a.

The housing 100 may include a housing main body 101 forming the storage space. In detail, the housing main body 101 may include a bottom surface part 101a forming a bottom surface of the housing 100, side surface parts 101b respectively extending upward from both sides of the bottom surface part 101a, and a rear surface part 101c connecting rear sides of both of the side surface parts 101b, the rear surface part 101c forming a rear surface of the housing 100.

A discharge part 105 that enables cold air circulating in the housing 100 to be discharged into the refrigerating compartment 18 may be formed in the side surface part 101b. The discharge part 105 may be formed at a lower portion of the side surface part 101b. For example, the discharge part 105 may be configured as a slit formed by cutting away at least one portion of the side surface part 101b. The discharge part 105 may be formed to extend in the top-bottom direction while having a narrow width.

A front surface part of the housing 100 is opened to communicate with the access hole 131a. The size of the front surface part of the housing 100 may correspond to the size of the access hole 131a.

In addition, a top surface part of the housing 100 may be opened such that the fan assembly 200 is provided therein. The opened top surface part may be defined by top ends of both of the side surface parts 101.

The housing 100 may be shaped to shield all parts from the refrigerating compartment 18 except for the discharge part 105. For example, the rear surface part 101c may include a shielded surface—in other words, the surface does not have a hole or cut-away part formed therein. Thus, the housing 100 can be configured such that the internal space of the housing 100 does not communicate with the refrigerating compartment 18 through the rear surface part 101c. Accordingly, cool air in the housing 100 is prevented from being discharged into the refrigerating compartment 18 through the rear surface part 101c. As a result, the circulation of the cool air in the housing 100 can be effectively performed.

A basket 110 may be provided in the storage space of the housing 100. The basket 110 may include a basket bottom surface part 110a forming a bottom surface of an accommodation space thereof, a basket front surface part 110b extending upward from a front portion of the basket bottom surface part 110a, basket side surface parts 110 respectively extending upward from both side surfaces of the basket bottom surface part 110a, and a basket rear surface part 110d connecting rear portions of both of the basket side surface parts 110c.

First support parts 103 for supporting the basket 110 may be provided at both sides of the housing 100, respectively. The first support part 103 may be configured to protrude forward from the side surface part 101b of the housing 100. There may be a plurality of first support parts 103 disposed to be spaced apart from each other in the top-bottom direction. For example, the first support part 103 may have a quadrangular plate-like shape.

The basket 110 may include a second support part 112 attached to an inside of the first support part 103. The second support part 112 may have a shape corresponding to the shape of the first support part 103, and may be configured to be held by one side of the first support part 103. The second support part 112 may be separably attached to the first support part 103.

For example, the basket 110 may be lifted upward to be separated from the housing 100. On the other hand, the basket 110 may be moved downward to be attached to the housing 100, and the holding between the first and second support parts 103 and 112 may be performed.

A first coupling part 103a attached to the inner door 13 may be provided at an outer side surface of the first support part 103. A second coupling part 133a separably attached to the first coupling part 103a may be provided at an inner circumferential surface of the inner door 13, i.e., an inner circumferential surface of the first door dike 133.

For example, the second coupling part 133a may be provided as a coupling projection, and the first coupling part 103a may include an accommodating groove into which at least one portion of the coupling projection is inserted. If the housing 100 is lifted to be separated from the inner door 13, the separation between the first and second coupling parts 103a and 133a may be performed. On the other hand, if the housing 100 is moved downward after the housing 100 is located such that the first coupling part 103a is located over the second coupling part 133a, the holding between the first and second coupling parts 103a and 133a is performed, so that the housing 100 can be attached to the inner door 13.

The fan assembly 200 may be provided at the opened top surface of the housing 100. As shown in FIG. 6, the fan assembly 200 may include the blowing fan 210 to generate a blowing force, a fan mounting part 230 having a through-part 235 at which the blowing fan 210 is disposed, and the fan cover 220 disposed at an upper side of the fan mounting part 230. The fan cover 220 may have the inlet 222 through which cold air in the refrigerating compartment 18 is introduced.

The blowing fan 210 includes a fan housing 211 attached to the through-part 235, and a blade 215 rotatably provided inside the fan housing 211.

The fan mounting part 230 may have a shape corresponding to the opened top surface of the housing 100. For example, the through-part 235 may be formed at an approximately central portion of the fan mounting part 230.

The fan cover 220 may be attached to the upper side of the fan mounting part 230. The fan cover 220 may further include the grill 223 installed in the inlet 222. The grill 223 is configured to prevent foreign substances from being introduced through the inlet 222, and protect a user's hand, etc. from being inserted into the blowing fan 210 through the inlet 222. The grill 223 may be formed curved to protrude upward from a top surface of the fan cover 220.

The fan assembly 200 may further include a shroud 240 installed at a lower side of the blowing fan 210 to uniformly distribute the flow of cold air passing through the blowing fan 210 to the storage space of the housing 100. For example, the shroud 240 may guide the flow of cold air to be distributed to front and rear portions of the storage space of the housing 100.

Figure 7:
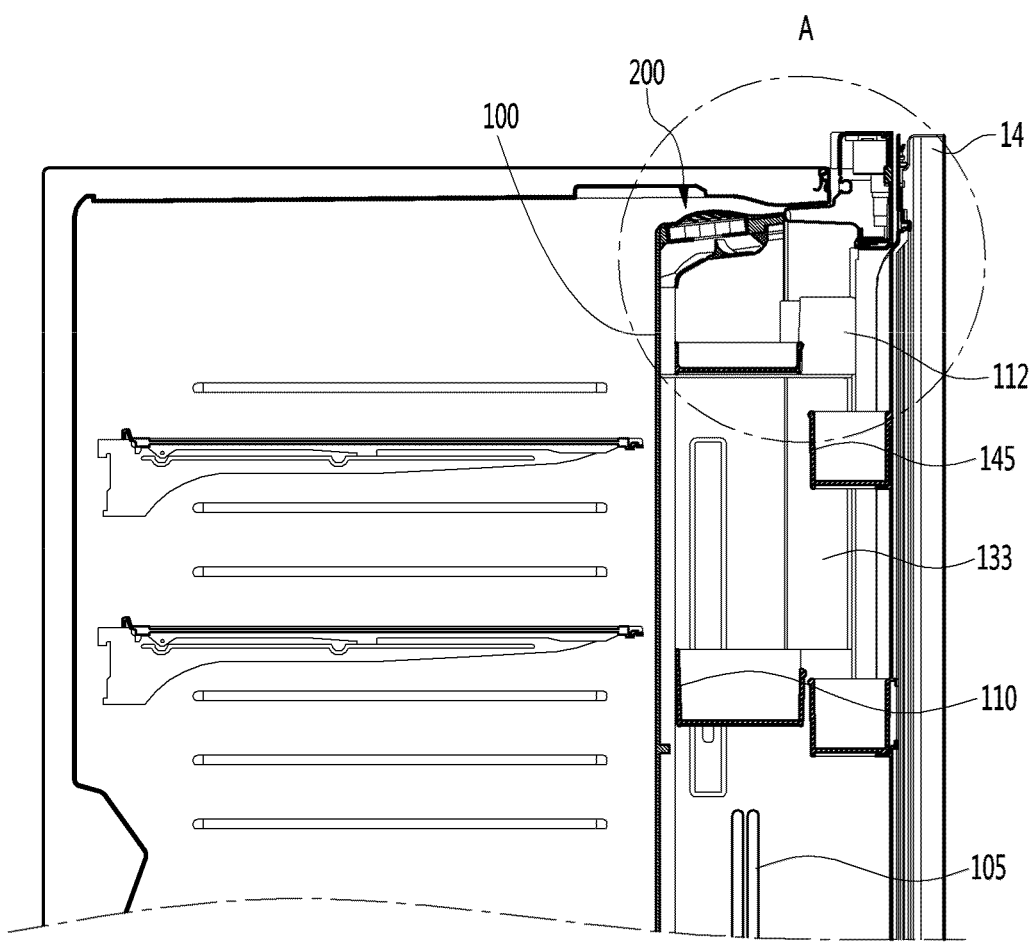
FIG. 7 is a sectional view taken along line VII-VII' of FIG. 1.
Figure 8:
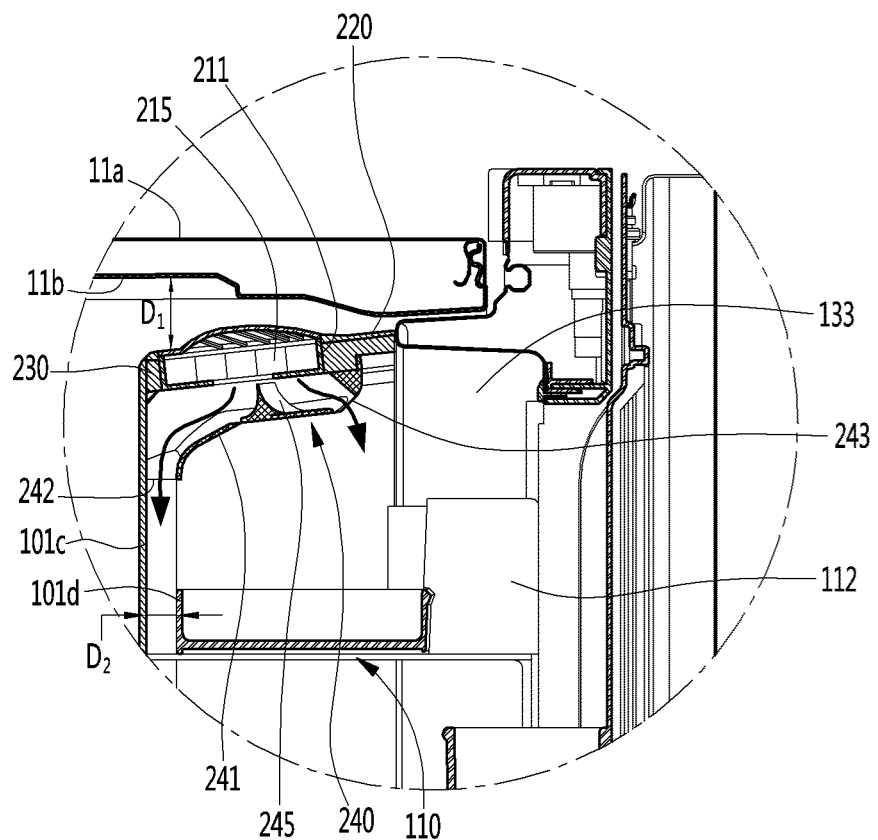
FIG. 8 is an enlarged view of "A" of FIG. 7.

FIG. 7 is a sectional view taken along line VII-VII' of FIG. 1. FIG. 8 is an enlarged view of "A" of FIG. 7.

Referring to FIGS. 7 and 8, the cabinet 11 may include an outer part 11a forming an external appearance of the refrigerator 10 and an inner part or inner case 11b forming an inner surface that defines the storage compartments 18 and 19. The inner case 11b may form a top surface, left and right side surfaces, and a rear surface of the refrigerating compartment 18.

The fan assembly 200 may be provided at an upper portion of the housing 100. In order to enable cold air in the refrigerating compartment 18 to be smoothly introduced into the storage space of the housing 100 as the blowing fan 210 is driven, a top surface of the blowing fan 210 or the fan mounting part 220 and a top surface of the inner case 11b may be spaced apart from each other at a first set distance D1. For example, the first set distance D1 may be 20 to 30 mm, but is not limited thereto.

The shroud 240 may include a shroud main body 241 having a plurality of outlets 242 and 243. The plurality of outlets 242 and 243 may be located at a lower side of the blowing fan 210, form flow paths of cold air passing through the blowing fan 210, and allow the cold air to be discharged into the storage space of the housing 100 therethrough.

The plurality of outlets 242 and 243 may include a first outlet 242 through which the cold air is discharged in one direction of the storage space and a second outlet 243 through which the cold air is discharged in another direction of the storage space.

For example, the one direction may be a direction toward a rear part of the housing 100, and the another direction may be a direction toward a front part of the housing 100.

The first outlet 242 may be formed at a rear part of the shroud main body 241, and the second outlet 243 may be formed at a front part of the shroud main body 241.

The shroud 240 may further include a flow guide 245 upwardly extending toward the blowing fan 210 from a bottom surface of the shroud main body 241. The sectional area of the flow guide 245 may be configured to be decreased toward the top from the bottom surface of the shroud main body 241. In addition, a top end of the flow guide 245 may be disposed at a position in close proximity to the blowing fan 210.

The flow path of cold air discharged through the first outlet 242 via the blowing fan 210 may be referred to as a "first flow path," and the flow path of cold air discharged through the second outlet 243 via the blowing fan 210 may be referred to as a "second flow path."

The size or sectional area of the first flow path may be greater than the size or sectional area of the second flow path. To this end, the flow guide 245 may extend upward from a point located relatively forward of the bottom surface of the shroud main body 241, i.e., a point closer to the second outlet 243 than the first outlet 242.

According to the above-described configuration of the shroud 240, a relatively large amount of cold air in the cold air passing through the blowing fan 210 may flow through the first outlet 242, and a relatively small amount of cold air in the cold air passing through the glowing fan 210 may flow through the second outlet 243. The flow of cold air may be referred to as a "first flow" or "main flow," and the flow of cold air through the second outlet 243 may be referred to as a "second flow" or "sub-flow."

The first flow may be provided downward along the rear surface part 101c of the housing 100. In order to allow the first flow to be smoothly made, the rear surface part 101c of the housing 100 and the basket rear surface part 110d of the basket 110 may be spaced apart from each other at a second set distance D2. For example, the second set distance D2 may be 10 to 20 mm, but is not limited thereto.

The first flow may be provided at a lower portion of the housing 100 along the spaced space, and at least one portion of the first flow may be discharged through the discharge part 105.

The second flow may be provided toward the basket 110 and the outer basket 145, thereby refrigerating food accommodated in the baskets 110 and 145. In addition, the second flow may be provided to the lower portion of the housing 100, and at least one portion of the second flow may be discharged through the discharge part 105.

According to the above-described configuration of the flow paths of the cold air, the cold air can be smoothly supplied to the front part of the housing 100, at which the basket 110 and the outer basket 145 are located, and the rear surface part 101c of the housing 100, which is not relatively easily refrigerated. Accordingly, the storage space of the housing 100 can be effectively refrigerated.

Hereinafter, second and third embodiments will be described. These embodiments are different from the first embodiment in the installation position of a fan assembly and the supply structure of cold air, and therefore, differences regarding those features will be primarily described. Descriptions of parts identical to those of the first embodiment will be denoted by the descriptions and reference numerals of the first embodiment.

Figure 9:
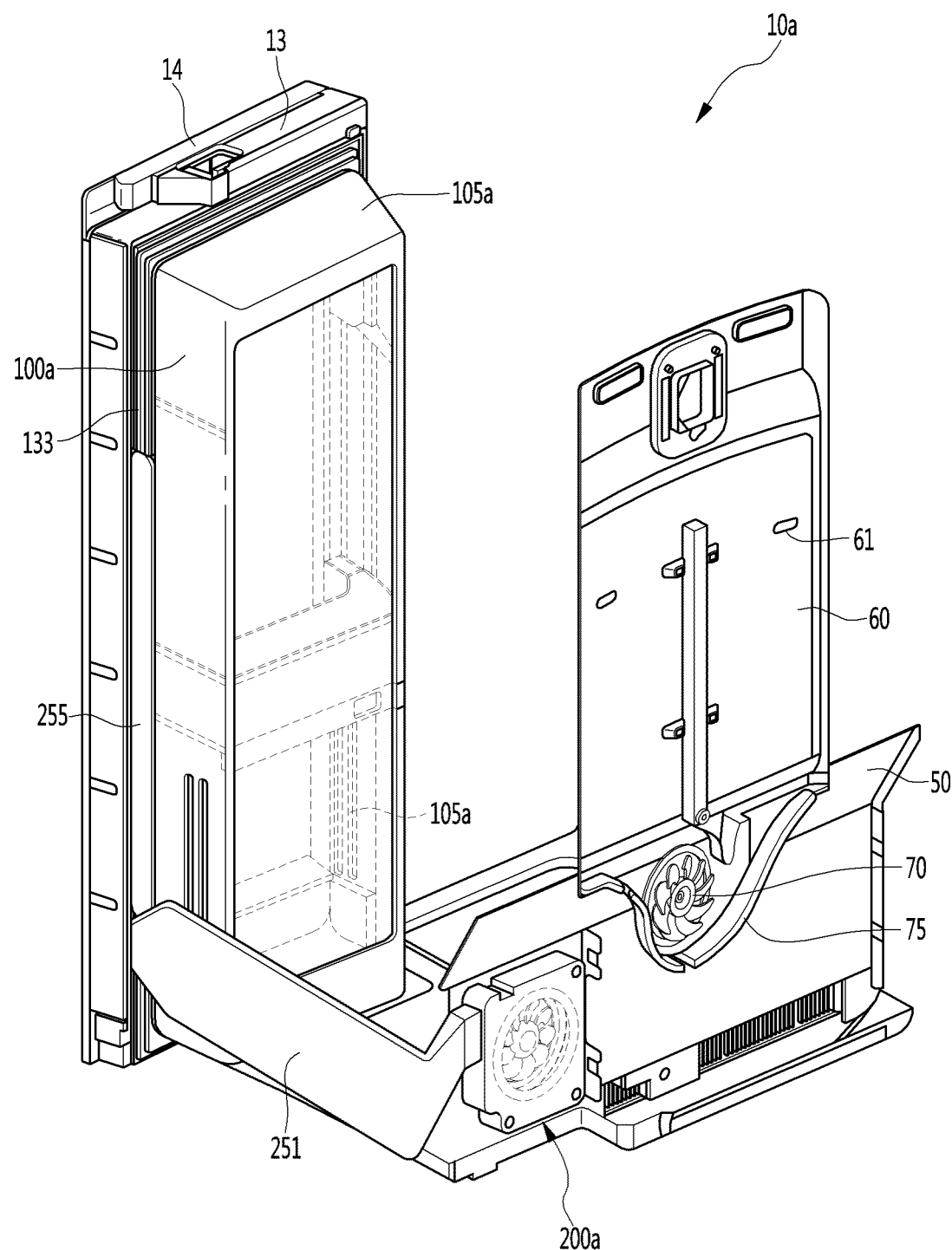
FIG. 9 is a view showing a partial configuration of a refrigerator according to a second embodiment of the present disclosure.
Figure 10:
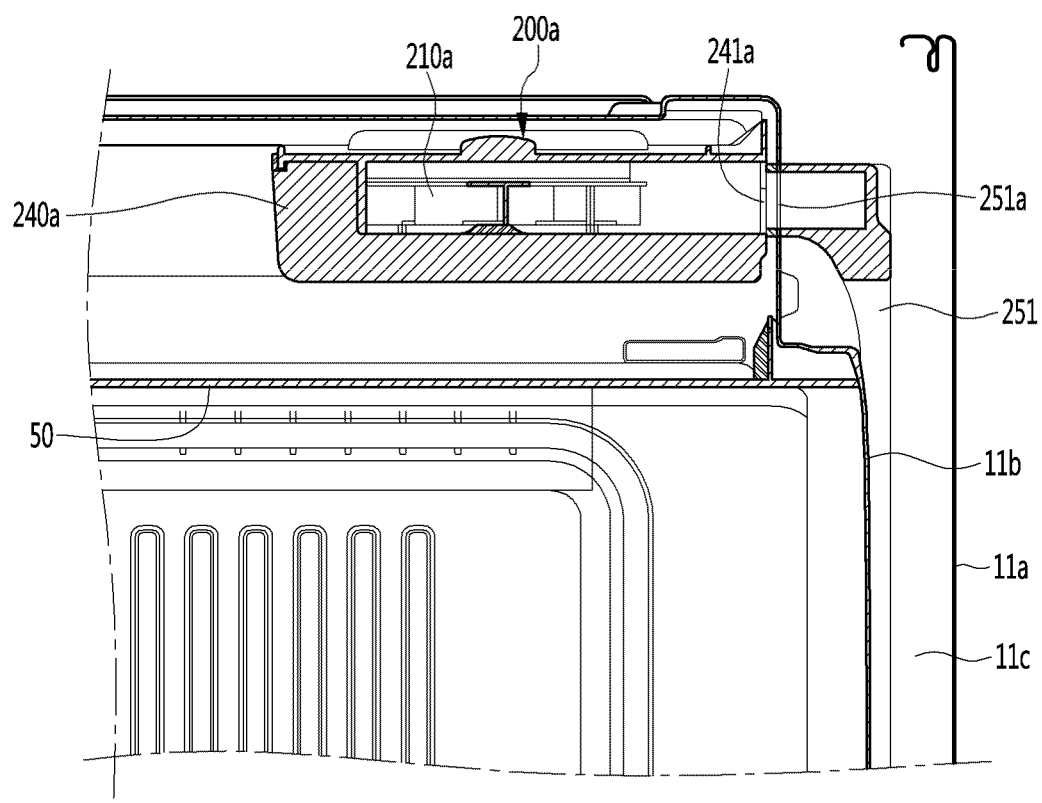
FIG. 10 is a view of a different partial configuration of the refrigerator according to the second embodiment.
Figure 11:
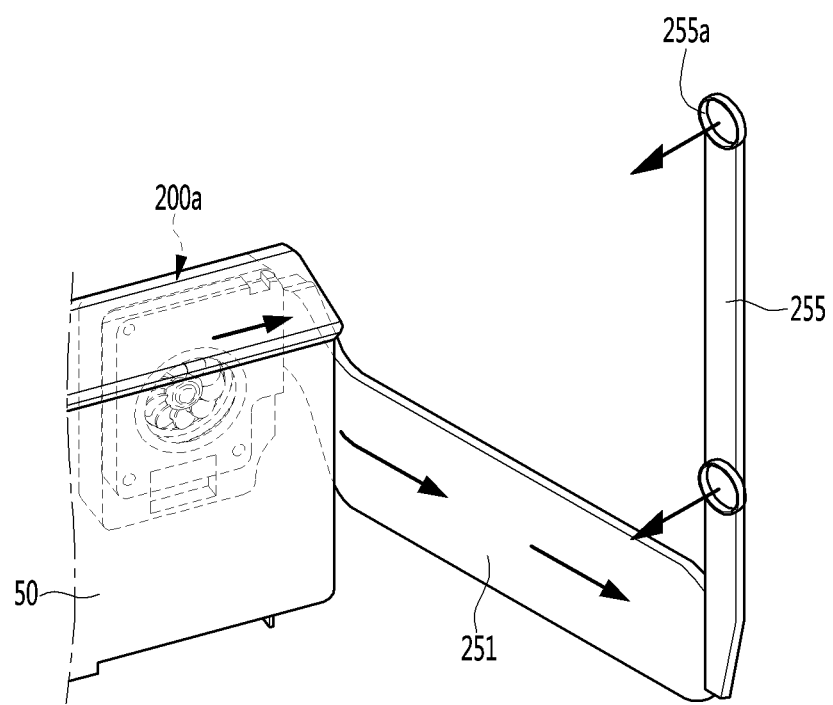
FIG. 11 is a view of yet a different partial configuration of the refrigerator according to the second embodiment.
Figure 12:
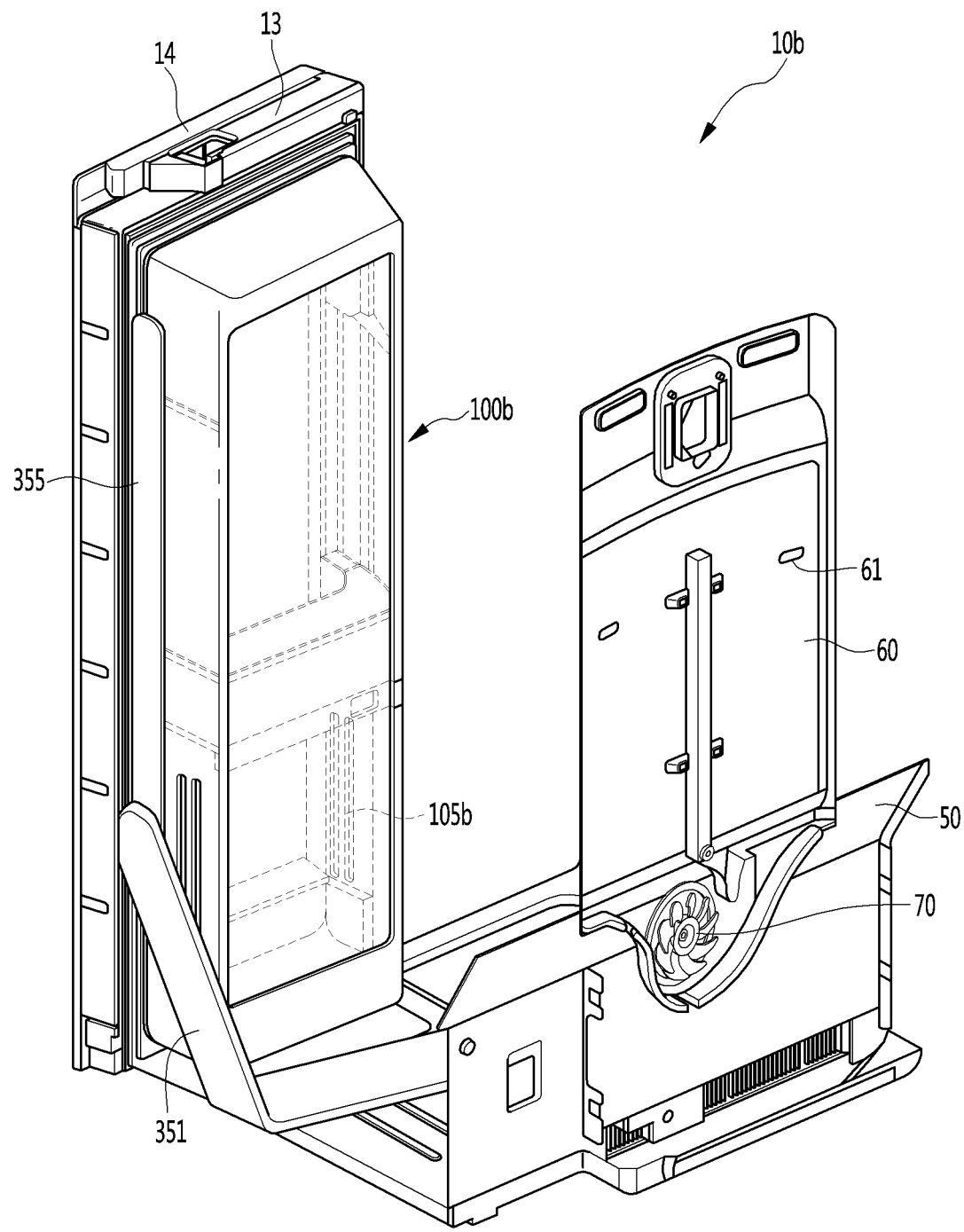
FIG. 12 is a view showing a partial configuration of a refrigerator according to a third embodiment of the present disclosure.
Figure 13:
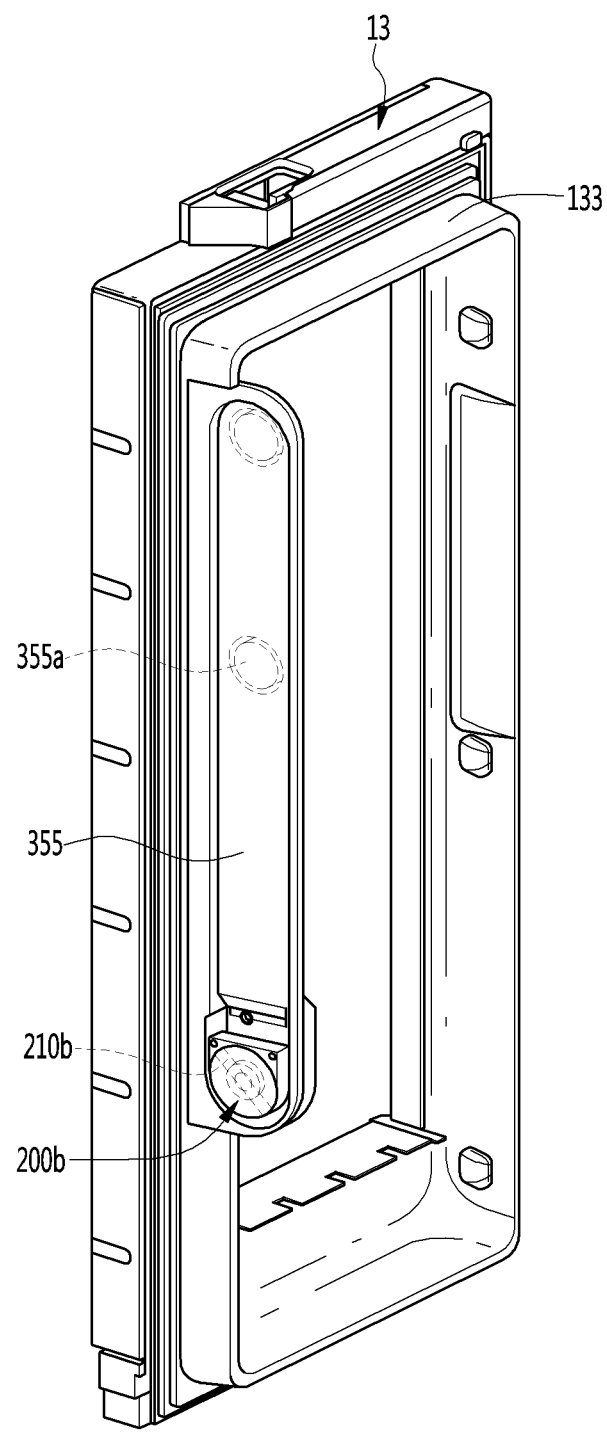
FIG. 13 is a view of a different partial configuration of the refrigerator according to the third embodiment.
Figure 14:
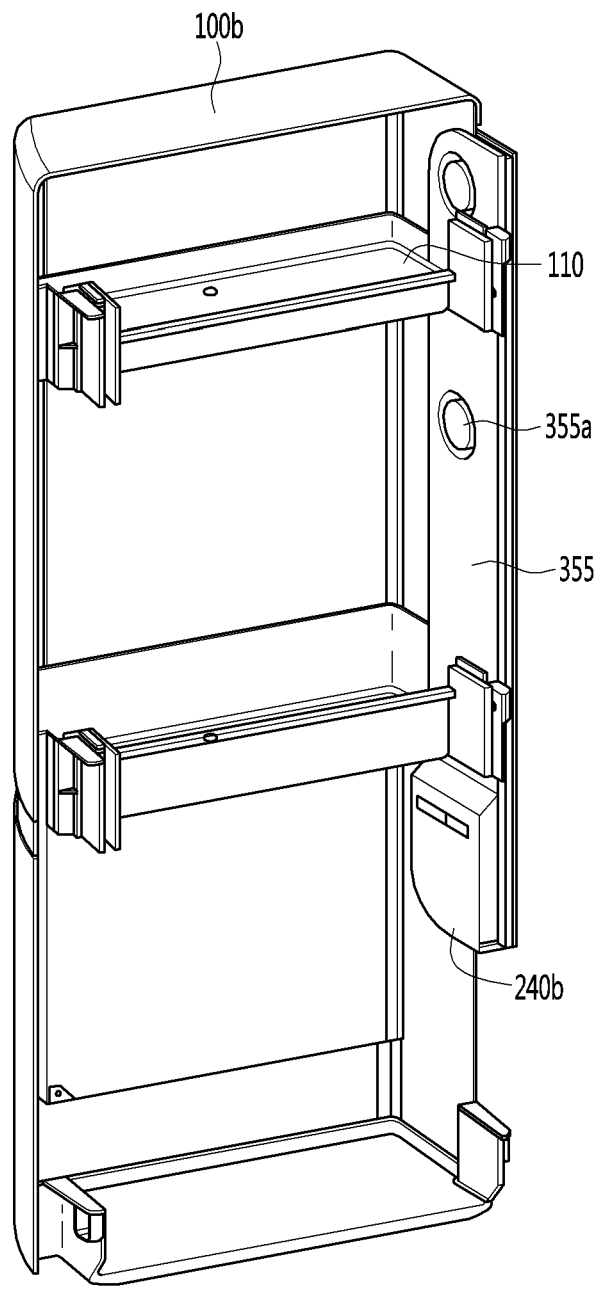
FIG. 14 is a view of yet a different partial configuration of the refrigerator according to the third embodiment.
Figure 15:
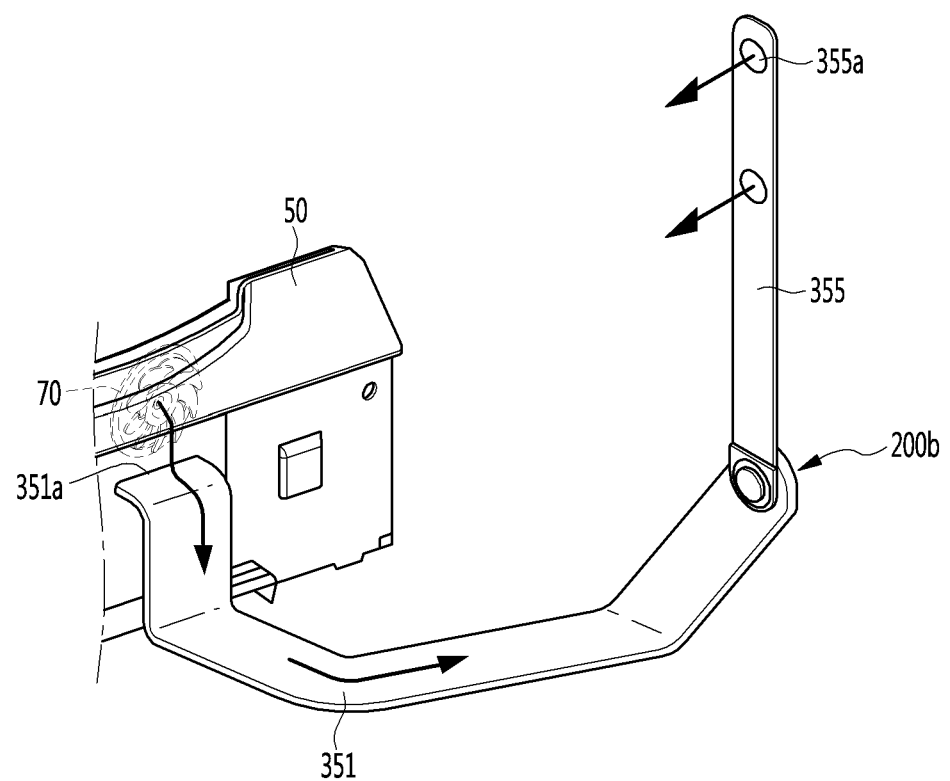
FIG. 15 is a view of yet another different partial configuration of the refrigerator according to the third embodiment.

FIGS. 9 through 11 are views showing a partial configuration of a refrigerator according to a second embodiment.

Referring to FIGS. 9 through 11, the refrigerator 10a may include a refrigerating compartment door having an inner door 13 and an outer door 14. The inner door 13 may include a housing 100a in which a storage space is formed.

The housing 100a may include a bottom surface part, both side surface parts, a rear surface part, and a top surface part. The housing 100a of the second embodiment may be similar to is similar to the housing 100 of the first embodiment in that the rear surface part is configured to be shielded from the refrigerating compartment 18. Additionally, the top surface part of the housing 100a may also be configured to be shielded from the refrigerating compartment 18.

Discharge parts 105a through which cold air is discharged from the storage space may be provided at both the side surface parts of the housing 100a, respectively.

The refrigerator 10a may include a multi-duct 60 forming a rear wall of the refrigerating compartment 18, the multi-duct 60 having a cold air discharge hole 61 through which cold air is discharged into the refrigerating compartment 18, and a rear panel 50 located at a lower side of the multi-duct 60, the rear panel 50 shielding the front of an evaporator (not shown). The rear panel 50 may be located so as to be spaced apart in a forward from the inner case 11b of the cabinet 11. A heat exchange compartment having the evaporator (not shown) installed therein may be formed in a space between the inner case 11b and the rear panel 50.

An evaporation fan 70 and an evaporation fan shroud 75 for guiding the flow path of cold air passing through the evaporation fan 70 may be provided at the lower side of the multi-duct 60. The front of the evaporation fan 70 and the evaporation fan shroud 75 may be shielded by the rear panel 50. That is, the evaporation fan 70 and the evaporation fan shroud 75 may be located at a rear side of the rear panel 50.

The refrigerator 10a may further include a fan assembly 200a generating a blowing force so as to supply cold air into the housing 100a. The fan assembly 200a may be located at the rear of the rear panel 50.

The fan assembly 200a may include a blowing fan 210a generating the blowing force and a shroud 240a attached to the rear panel 50 to guide the flow of cold air passing through the blowing fan 210a.

A shroud outlet 241a through which cold air is discharged from the fan assembly 200a may be formed at one side surface of the shroud 240a.

The refrigerator 10a may further include a duct 251 and 255 extending to the housing 100a from one side of the rear panel 50, to supply the cold air discharged from the fan assembly 200a into the housing 100a.

The duct 251 and 255 may include a first duct 251 having a duct entrance 251a attached to the shroud discharge part 241a. The first duct 251 may extend forward along a side of the refrigerating compartment 18. For example, the first duct 251 may extend to the side surface part of the housing 100a.

The first duct 251 may be inserted into a heat insulating material 11c provided between the outer part 11a and the inner case 11b.

The duct 251 and 255 may further include a second duct 255 connected to the first duct 251, the second duct 255 being attached to the second door dike 133 of the inner door 13. The second duct 255 may be attached to the second door dike 133 and extend in the top-bottom direction of the refrigerator 10a.

A duct exit 255a through which cold air flowing in the second duct 255 is discharged into the inner space of the housing 100a may be formed in the second duct 255. There may be a plurality of duct exits 255a, and the plurality of duct exits 255a may be spaced apart from each other in the top-bottom direction of the refrigerator 10a and communicate with the inner space of the housing 100a.

If the blowing fan 210a is driven, cold air generated by the evaporator may flow into the first duct 251 via the shroud outlet 241a and the duct entrance 251a. The cold air may then be introduced into the second duct 255, and may be introduced into the housing 100a through the duct exit 255a.

At least one portion of the cold air supplied into the housing 100a may be discharged into the refrigerating compartment 18 through the discharge parts 105a respectively provided at both the side surface parts of the housing 100a.

According to the above-described configuration, the cold air generated by the evaporator can be supplied into the storage space of the housing, and accordingly, the temperature in the storage space of the housing can be controlled to a set temperature.

FIGS. 12 through 15 are views showing a partial configuration of a refrigerator according to a third embodiment. Referring to FIGS. 12 through 15, the refrigerator 10b according to the third embodiment may include a duct 351 and 355 for supplying cold air generated by an evaporator into a housing 100b. The duct 351 and 355 may extend to the housing 100b from one side of the rear panel 50.

The duct 351 and 355 may include a first duct 351 attached to the rear panel 50, the first duct 351 having a duct entrance 351a through which cold air is introduced. At least one portion of the first duct 351 may be inserted in an internal heat insulating material of a partition wall that partitions the storage compartment into the refrigerating compartment 18 and the freezing compartment 19.

The first duct 351 may extend toward a side surface part of the refrigerating compartment 18. At least one portion of the first duct 351 may extend to the side surface part of the refrigerating compartment 18, as described in the second embodiment, and may be inserted into the heat insulating material 11c provided between the outer part 11a and the inner case 11b.

The duct 351 and 355 may further include a second duct 355 connected to the first duct 351, the second duct 355 being attached to the second door dike 133 of the inner door 13. The second duct 255 may be attached to the second door dike 133 and extend in the top-bottom direction of the refrigerator 10a.

A fan assembly 200b may be installed at the second duct 355. The fan assembly 200b may be installed at a point where the first duct 351 and the second duct 355 are connected to each other, e.g., a lower portion of the second duct 355.

The fan assembly 200b may include a blowing fan 210b generating a blowing force and a shroud 240b attached to the second duct 355, the shroud 240b guiding the flow of cold air passing through the blowing fan 210b. An internal space of the shroud 240b communicates with that of the second duct 355, and the blowing fan 210b may be installed in the internal space of the shroud 240b.

A duct exit 355a through which cold air flowing in the second duct 355 is discharged into the internal space of the housing 100b may be formed in the second duct 355. There may be a plurality of duct exits 355a, and the plurality of duct exits 355a may be spaced apart from each other in the top-bottom direction of the refrigerator 10a.

If the blowing fan 210b is driven, the cold air generated by the evaporator may be introduced into the second duct 355 by passing through the fan assembly 200b via the first duct 351. The cold air in the second duct 355 may then be introduced into the housing 100b through the duct exit 355a.

At least some of the cold air supplied into the housing 100b may be discharged into the refrigerating compartment 18 through discharge parts 105b respectively provided at both side surface parts of the housing 100b.

According to the above-described configuration, the cold air generated by the evaporator can be supplied into the storage space of the housing, and accordingly, the temperature in the storage space of the housing can be controlled to a set temperature.

According to the present disclosure, cold air existing in the refrigerating compartment or cold air generated by the evaporator can be supplied into the housing of the door by operation of the blowing fan, so that the temperature in the housing can be maintained to a set temperature or less.

In addition, according to the present disclosure, the blowing fan may be installed at the top surface of the housing, and the shroud may be provided at the lower side of the blowing fan, such that cold air passing through the blowing fan can be uniformly distributed into the housing through the shroud.

In addition, according to the present disclosure, the rear surface of the housing may be spaced apart from the rear part of the basket, such that cold air can easily flow into a lower portion of the housing via the front and rear parts of the basket.

In addition, according to the present disclosure, the entire part except the outlet in the housing may be shielded from the refrigerating compartment, such that cold air circulating in the housing may not leak toward the refrigerating compartment.

In addition, according to the present disclosure, the cold air generated by the evaporator can be directly supplied into the housing through the duct, such that the temperature in the housing can be sufficiently dropped.

In addition, according to the present disclosure, since the duct is installed in the cabinet, the duct is not exposed to a user, so that it is possible to prevent an external appearance from being deteriorated by the duct.

Even though all the elements of the embodiments are attached into one or operated in the combined state, the present disclosure is not limited to such an embodiment. That is, all the elements may be selectively combined with each other without departing the scope of the disclosure. Furthermore, when it is described that one comprises (or includes or has) some elements, it should be understood that it may comprise (or include or have) only those elements, or it may comprise (or include or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Although embodiments have been described with reference to a number of illustrative embodiments thereof, it will be understood by those skilled in the art that various changes in form and details may be made therein without departing from the spirit and scope of the disclosure as defined by the appended claims. Therefore, the preferred embodiments should be considered in descriptive sense only and not for purposes of limitation, and also the technical scope of the disclosure is not limited to the embodiments. Furthermore, is defined not by the detailed description of the disclosure but by the appended claims, and all differences within the scope will be construed as being comprised in the present disclosure.

The invention claimed is:

1. A refrigerator, comprising:
   a cabinet defining a storage compartment therein;
   a door configured to open or close at least a portion of the storage compartment, wherein the door includes an inner door having an access hole rotatable with respect to the cabinet, and an outer door rotatable with respect to the inner door;
   a housing provided for the inner door and an upper surface of the housing having an opening, wherein the inner door and the housing define a door storage space, and the outer door is configured to allow access to the door storage space through the access hole when the outer door is rotated to an open position;
   at least one basket disposed within the door storage space;
   a blowing fan provided at the opening of the housing and configured to draw air from the storage compartment into the door storage space; and
   a first discharge port formed in a first lateral side surface of the housing and a second discharge port formed in a second lateral side surface of the housing, the first and second lateral side surfaces being different lateral side surfaces of the housing, the first and second discharge ports configured to allow the air from the door storage space to escape into the storage compartment.

2. The refrigerator of claim 1, wherein the storage compartment is a refrigerator compartment, and a freezer compartment is disposed below the refrigerator compartment, and the door opens or closes the refrigerator compartment.

3. The refrigerator of claim 1, wherein the blowing fan is provided between a grill and a shroud, the shroud having at least one inclined surface to guide the air drawn in through the grill by the blowing fan into the door storage space.

4. The refrigerator of claim 1, wherein the blowing fan is oriented at an angle with respect to a horizontal plane, the horizontal plane extending perpendicular to a central longitudinal axis of the door when the door is closed.

5. The refrigerator of claim 4, wherein the upper surface of the housing is inclined like the blowing fan.

6. The refrigerator of claim 5, wherein the blowing fan is fixed to align with the opening provided on the upper surface of the housing.

7. The refrigerator of claim 1, wherein a first gap is provided between an upper surface of the blowing fan and an upper inner wall of the storage compartment when the door is closed.

8. The refrigerator of claim 7, wherein a second gap is provided between a rear surface of the basket and a rear surface of the housing.

9. The refrigerator of claim 1, wherein at least one basket includes a first basket and a second basket provided below the first basket, a front wall of the first basket having a first height and a front wall of the second basket having a second height, wherein the first height is smaller than the second height.

10. The refrigerator of claim 1, wherein at least one side of the outer door is thinner than the inner door.

11. The refrigerator of claim 1, wherein the at least one basket is provided between the blowing fan and at least one of the first discharge port or the second discharge port.

12. The refrigerator of claim 1, wherein the first and second lateral side surfaces are opposite sides.

13. A refrigerator, comprising:
    a cabinet defining a storage compartment therein;
    an evaporator configured to cool air and provided behind a rear wall of the storage compartment;
    an evaporator fan provided behind the rear wall and configured to blow the cooled air into the storage compartment;
    a door configured to open or close at least a portion of the storage compartment, wherein the door includes an inner door having an access hole rotatable with respect to the cabinet, and an outer door rotatable with respect to the inner door;
    a housing provided for the inner door and an upper surface of the housing having an opening, wherein the inner door and the housing define a door storage space, and the outer door is configured to allow access to the door storage space through the access hole when the outer door is rotated to an open position;
    at least one basket disposed within the door storage space; and
    a blowing fan provided at the opening of the housing and configured to draw the cooled air of the evaporator blown into the storage compartment by the evaporator fan into the door storage space such that cooled air flows into the door storage space for maintaining a temperature in the door storage space to a set temperature or less,
    wherein the upper surface of the housing is oriented at an angle with respect to a horizontal plane such that the opening provided on the top surface of the housing is angled, the horizontal plane extending perpendicular to a central longitudinal axis of the door when the door is closed, and wherein the blowing fan is angled like the upper surface of the housing and aligned with the opening to directly cover the opening provided on the upper surface of the housing such that the cold air from the storage compartment is drawn into the door storage space.

14. The refrigerator of claim 13, further comprising at least one first discharge port formed in a first lateral side surface of the housing and at least one second discharge port formed in a second lateral side surface of the housing such as to allow the cooled air flowing through the door storage space to escape into the storage compartment.

15. The refrigerator of claim 13, wherein a first gap is provided between an upper surface of the blowing fan and an upper inner wall of the storage compartment when the door is closed.

16. The refrigerator of claim 15, wherein a second gap is provided between a rear surface of the housing and a rear surface of the at least one basket to allow the cool air to flow between the second gap.

17. The refrigerator of claim 13, wherein the blowing fan is provided between a grill and a shroud, the shroud having at least one inclined surface to guide the air drawn in through the grill by the blowing fan into the door storage space.

18. A refrigerator, comprising:
a cabinet defining a storage compartment therein;
a door configured to open or close at least a portion of the storage compartment, wherein the door includes an inner door having an access hole rotatable with respect to the cabinet and an outer door rotatable with respect to the inner door;
a housing provided for the inner door, the housing having first and second side surfaces, which are different side surfaces, a rear surface connected to the first and second side surfaces and a top surface configured to provide an opening, wherein the inner door and the housing define a door storage space, and the outer door is configured to allow access to the door storage space through the access hole when the outer door is rotated to an open position;
at least one basket disposed within the door storage space;
a blowing fan disposed at the opening and configured to draw air into the door storage space through the opening; and
at least one discharge port configured to allow the air from the door storage space to escape into the storage compartment, wherein the at least one discharge port includes a first discharge port formed in the first side surface of the housing and a second discharge port formed in the second side surface of the housing, wherein a first gap is provided between an upper surface of the blowing fan and an upper inner wall of the storage compartment when the door is closed.

19. The refrigerator of claim 18, wherein the top surface of the housing is oriented at an angle with respect to a horizontal plane, the horizontal plane extending perpendicular to a central longitudinal axis of the door when the door is closed.

20. The refrigerator of claim 19, wherein a second gap is provided between a rear surface of the at least one basket and the rear surface of the housing.

21. The refrigerator of claim 19, wherein the blowing fan is angled like the top surface of the housing.

22. The refrigerator of claim 18, wherein the opening is defined by top ends of first and second side surfaces, and the housing further includes a bottom surface.

23. The refrigerator of claim 18, wherein at least one of the first discharge port or the second discharge port is provided below the at least one basket.

24. The refrigerator of claim 18, wherein the first and second side surfaces are opposite side surfaces.

* * * * *